(12) United States Patent
Demuynck

(10) Patent No.: US 8,107,229 B2
(45) Date of Patent: Jan. 31, 2012

(54) PORTABLE COMMUNICATION DEVICE HAVING A PRINTED CIRCUIT BOARD SLIDER HINGE ASSEMBLY

(75) Inventor: Randolph C. Demuynck, Wake Forest, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 806 days.

(21) Appl. No.: 12/048,783

(22) Filed: Mar. 14, 2008

(65) Prior Publication Data

US 2009/0229081 A1 Sep. 17, 2009

(51) Int. Cl.
*H05K 5/00* (2006.01)
(52) U.S. Cl. .............. 361/679.27; 361/681; 361/679.01; 361/679.09; 361/679.28; 361/679.55; 361/679.56
(58) Field of Classification Search .................. 361/814, 361/816, 818, 728, 749, 681, 679.01, 679.07, 361/679.09, 679.26–679.29, 679.55–679.58; 455/575.1, 575.3, 575.4, 575.8, 90.3, 550.1, 455/566; 379/433.11, 433.12, 433.13, 429, 379/433, 457; 16/233, 235, 282, 302
See application file for complete search history.

(56) References Cited

U.S. PATENT DOCUMENTS

| | | | | |
|---|---|---|---|---|
| 5,567,917 A * | 10/1996 | Hayashi | ........................ | 174/258 |
| 7,425,760 B1 * | 9/2008 | Guenin et al. | ................ | 257/698 |
| 7,483,273 B2 * | 1/2009 | Uehara et al. | ................ | 361/715 |
| 7,813,776 B2 * | 10/2010 | Lee et al. | .................... | 455/575.4 |
| 2005/0237703 A1 * | 10/2005 | Angelhag | ...................... | 361/683 |
| 2005/0266897 A1 * | 12/2005 | Ahn et al. | .................. | 455/575.1 |
| 2006/0033837 A1 | 2/2006 | Kwon | | |
| 2006/0046796 A1 * | 3/2006 | Park et al. | ................. | 455/575.4 |
| 2007/0216036 A1 * | 9/2007 | Krishnamoorthy et al. | .. | 257/782 |
| 2007/0217132 A1 * | 9/2007 | Collins | ........................ | 361/681 |
| 2008/0051164 A1 * | 2/2008 | Joo et al. | ..................... | 455/575.4 |
| 2008/0132284 A1 * | 6/2008 | Ryu et al. | ...................... | 455/566 |
| 2008/0201905 A1 * | 8/2008 | Hanssen et al. | ................. | 16/320 |
| 2009/0017874 A1 * | 1/2009 | Hong et al. | .................... | 455/566 |
| 2009/0029741 A1 * | 1/2009 | Satou et al. | ................... | 455/566 |
| 2010/0048264 A1 * | 2/2010 | Sato et al. | ................... | 455/575.4 |
| 2010/0097750 A1 * | 4/2010 | Souda | ...................... | 361/679.33 |

FOREIGN PATENT DOCUMENTS

WO 2005/112405 11/2005
WO 2008/013572 1/2008

OTHER PUBLICATIONS

International Search Report and Written Opinion for International Application No. PCT/US2008/076181 dated Feb. 20, 2009.
International Preliminary Report on Patentability for International Application No. PCT/US2008/076181 dated May 21, 2010.

\* cited by examiner

*Primary Examiner* — Hoa C Nguyen
(74) *Attorney, Agent, or Firm* — Renner, Otto, Boisselle & Sklar, LLP

(57) ABSTRACT

A portable communication device includes a base and a top portion that are operatively coupled by a slider hinge assembly that is configured to facilitate sliding motion between the base and the top portion. The slider hinge assembly includes a base hinge member and an upper hinge member, where the base hinge member and/or the upper hinge member are comprised of a printed circuit board material.

22 Claims, 4 Drawing Sheets

PORTABLE COMMUNICATION DEVICE HAVING A PRINTED CIRCUIT BOARD SLIDER HINGE ASSEMBLY

TECHNICAL FIELD OF THE INVENTION

The present invention relates generally to portable communication devices, and more particularly, to a portable communication device having a printed circuit board (PCB) slider hinge assembly.

DESCRIPTION OF RELATED ART

Portable communication devices, and in particular mobile telephones, are used for a wide variety of applications. For example, mobile phones are used not only for phone conversations and for sending/receiving messages, but also for browsing the internet, viewing multimedia content, such as movies or music, and for playing games, etc.

In general, the display screen on a mobile phone is limited by the size of the phone. As mobile phones are reduced in size, the surface area available for the display screen, functional keys and a keypad is reduced. In order to maximize the size of the display screen, some mobile devices are designed with a base and a display that is movable relative to the base. In these mobile phones, the keypad often is incorporated into the base and exposed only after opening/moving the display. Known mobile devices of this variety include clamshell devices, in which the display is connected to the base via a conventional rotational hinge, and slider devices, in which the display is slidable with respect to the base, for example, on a rail or a track.

SUMMARY

A portable communication device is equipped with a printed circuit board slider hinge assembly. The slider hinge assembly includes a base hinge member and an upper hinge member constructed of printed circuit board material. The base hinge member and an upper hinge member are configured to slidably engage one another and to be electrically coupled by a flex circuit. The provision of a printed circuit board slider hinge assembly allows for a portable communication device having a stronger and more compact slider hinge assembly with improved heat dissipation.

One aspect of the disclosed technology relates to a portable communication device that includes a base and a top portion coupled to the base by a slider hinge assembly that is configured to facilitate sliding motion between the base and the top portion, the slider hinge assembly including a base hinge member and an upper hinge member; wherein the base hinge member and/or the upper hinge member are comprised of printed circuit board material.

According to another aspect, the base hinge member and the upper hinge member are comprised of printed circuit board material.

According to another aspect, the base hinge member and the upper hinge member are electrically coupled by a flex circuit.

According to another aspect, the base hinge member and the upper hinge member are electrically coupled by a board-to-board connector.

According to another aspect, the base hinge member and the upper hinge member are electrically coupled by a rigid flex connector.

According to another aspect, the base hinge member and the top hinge member are comprised of rigid flex printed circuit board material.

According to another aspect, the base hinge member and the top hinge member are comprised of single-sided rigid flex printed circuit board material.

According to another aspect, the base hinge member and the top hinge member are comprised of double-sided rigid flex printed circuit board material.

According to another aspect, the top portion includes a display electrically coupled to the upper hinge member.

According to another aspect, the display is a touch-sensitive display.

According to another aspect, the top portion includes a navigational control electrically coupled to the upper hinge member.

According to another aspect, the navigational control is configured as a touch-sensitive input device.

According to another aspect, the base includes a keypad electrically coupled to the base hinge member.

According to another aspect, the base hinge member and the upper hinge member are coupled by a rail assembly.

According to another aspect, the rail assembly is mounted directly on the printed circuit board material.

According to another aspect, the base hinge member and the upper hinge member each are coupled to a spring mounted directly on the printed circuit board material.

According to another aspect, the portable communication device is a mobile telephone.

Another aspect of the disclosed technology relates to a hinge assembly for use in connection with a portable communication device. The hinge assembly includes a base plate and an upper plate, wherein the base plate and upper plate are coupled by a rail assembly that is configured to facilitate sliding motion of the upper plate relative to the base plate; wherein the base plate and/or the upper plate are comprised of a printed circuit board material.

According to another aspect, the base plate and the upper plate are comprised of printed circuit board material.

According to another aspect, the base plate and the upper plate are comprised of rigid flex printed circuit board material.

According to another aspect, the base plate and the upper plate are electrically coupled by a flex circuit or a rigid flex connector.

According to another aspect, the rail assembly is mounted directly to the printed circuit board material.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
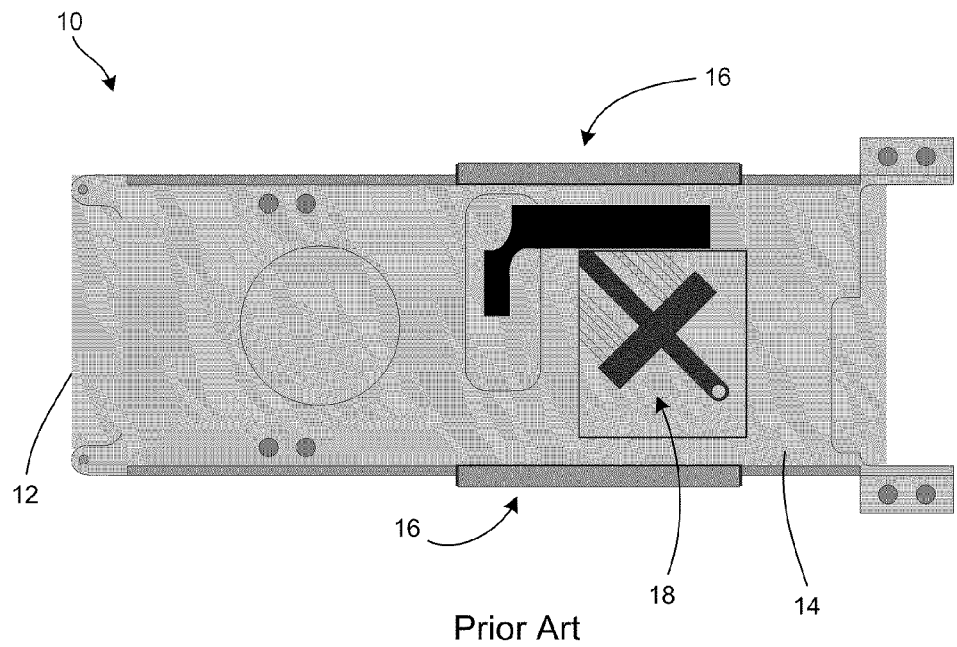
FIG. 1 is a top view of a conventional slider hinge in a closed position.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

As referred to herein, the term "portable communication device" includes portable radio communication equipment. The term "portable radio communication equipment", which herein after is referred to as a mobile phone, a mobile device, a mobile radio terminal or a mobile terminal, includes all electronic equipment, including, but not limited to, mobile telephones, pagers, communicators, i.e., electronic organizers, smartphones, personal digital assistants (PDAs), or the like.

In the context of the illustrated embodiments, the portable communication device is primarily referred to as a mobile telephone or a mobile phone. The description and illustrations of the mobile telephone, however, are intended to serve as a non-limiting exemplary environment for the inventive concepts described herein, and it will be appreciated that the invention is not intended to be limited to a mobile telephone, but rather can be any type of electronic equipment.

Many portable communication devices have a limited surface area that can be used for a display screen, functional keys and a keypad. As mobile communication devices become smaller and thinner in size, the surface area available for the screen and keys is reduced. To maximize the screen size, some mobile devices have incorporated the keys onto a separate surface, such as the base. The display of these mobile devices is movable with respect to the base when the keypad is accessed. One such type of mobile device is a clamshell device, in which the display is connected to the base via a flip hinge.

Another increasingly popular form factor is a slider form factor in which the top display is slidable with respect to the base, for example, on a rail or track. Slider devices may have a keypad on the base that is exposed by sliding the display vertically and/or horizontally with respect to the base. The display typically overlaps at least a portion of the base in order to keep the slider in the channel and the display attached to the base. The top or display portion is coupled to the base by a slider hinge assembly.

Figure 2:
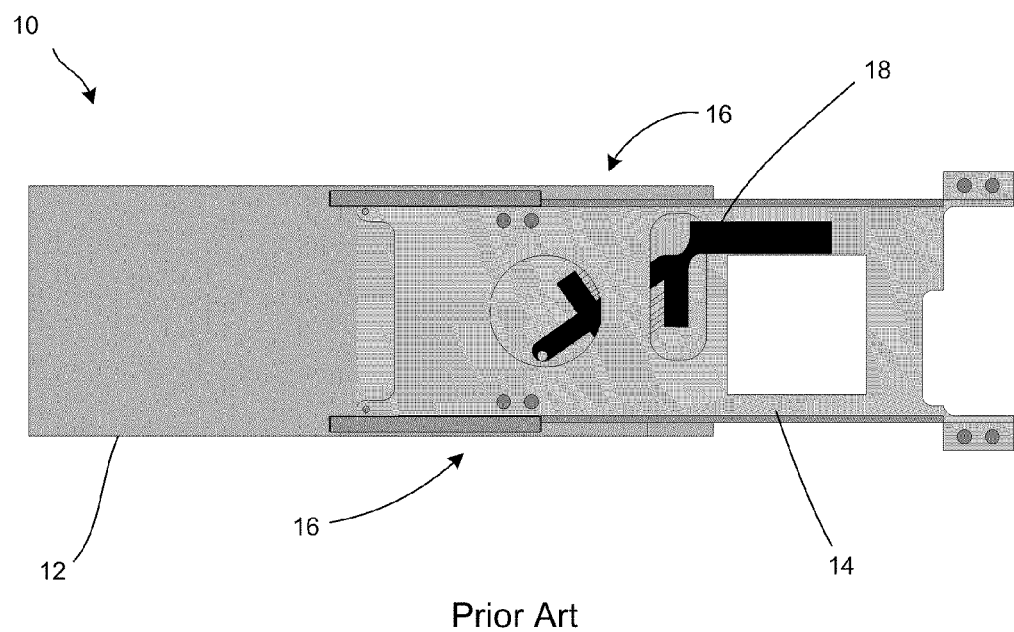
FIG. 2 is a top view of the slider hinge of FIG. 1 in an open position.

FIGS. 1 and 2 show a conventional slider hinge assembly 10 in open and closed positions, respectively. The slider hinge assembly 10 includes a base plate 12 and a top plate 14 that are operatively coupled by rail assemblies 16 such that the top plate 14 can slide or laterally translate a given distance relative to the base plate. A spring mechanism or other resilient member 18 also may be coupled to the base plate 12 and the top plate 14.

The hinge assembly used in current slider phones typically is made up of a pair of thin stamp steel plates coupled by slide rails and a spring mechanism. The present disclosure recognizes shortcomings with conventional slider devices (e.g., slider mobile phones), and the associated slider hinge assemblies. The use of thin stamp steel plates leads to increased size, cost and mechanical gap, less than optimal strength and heat dissipation. The present disclosure provides a portable communication device (e.g., a mobile phone) having a printed circuit board slider hinge assembly. The slider hinge assembly may be configured to include a base hinge member and an upper hinge member, where one or both of the base hinge member and the upper hinge member are comprised of printed circuit board (PCB) material, such as rigid flex PCB. As is described more fully below, the provision of a printed circuit board slider hinge assembly allows for a mobile phone having a stronger, more compact and more cost-effective slider hinge assembly with improved heat dissipation.

Figure 3:
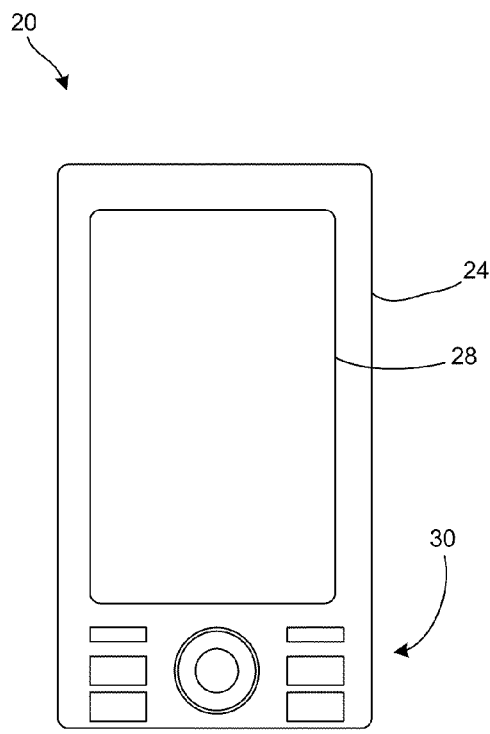
FIG. 3 is a top view of an exemplary portable communication device, such as a mobile telephone in a closed position.
Figure 4:
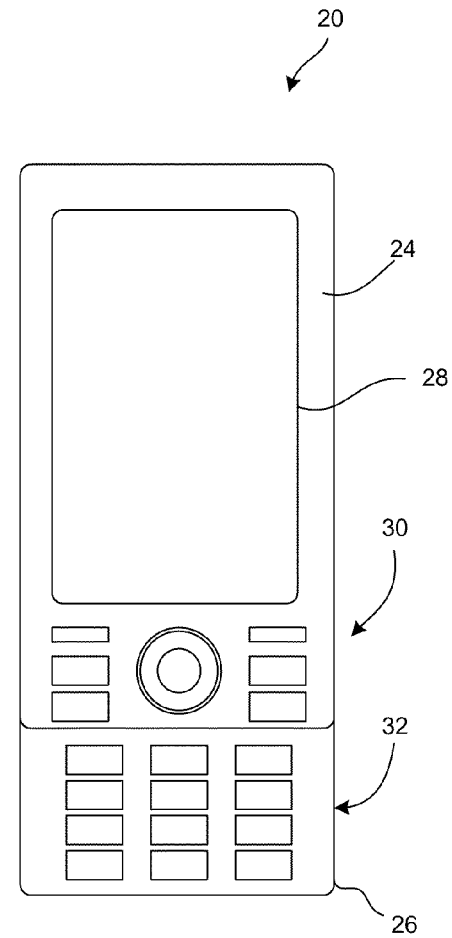
FIG. 4 is a top view of the mobile telephone of FIG. 3 in an open position.
Figure 5:
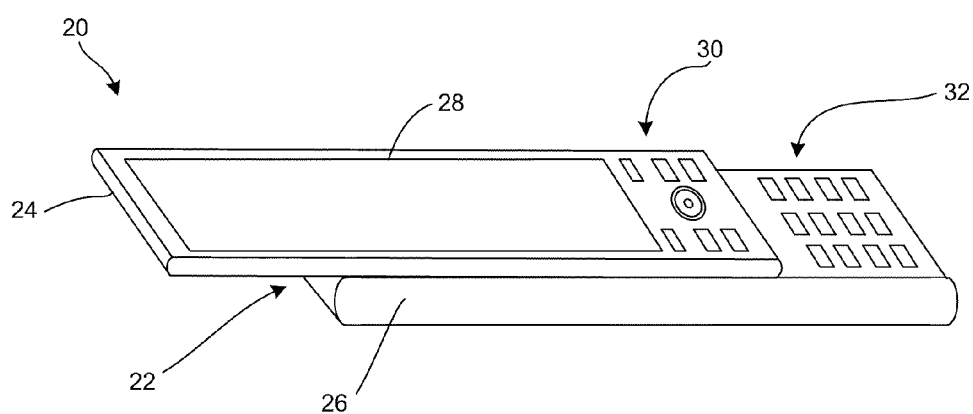
FIG. 5 is a side perspective view of the mobile phone of FIG. 4.

Referring now to FIGS. 3-5, an exemplary embodiment of a portable communication device 20 (e.g., a mobile phone, mobile terminal or the like) is depicted. As is described more fully below, the portable communication device 20 includes a printed circuit board hinge assembly 22 (also referred to simply as a hinge assembly or a slider hinge assembly) that provides or otherwise facilitates movement between a top portion 24 (also referred to as the display portion or display housing portion) and a base 26 (also referred to as the base portion or the base housing portion). In the illustrated exemplary embodiment, the top portion 24 includes a display 28, for example, a display that may be viewed when the phone is in a closed position and/or in a standby mode.

In addition, the top portion 24 also includes a set of functional and/or navigation keys or controls 30 that may provide for a variety of user input operations. For example, the functional keys 30 typically include special function keys, such as a "call send" key for initiating or answering a call, and a "call end" key for ending or "hanging up" a call. Special function keys also may include menu navigation keys, for example, for navigating through a menu displayed on the display(s) to select different telephone functions, profiles, settings, etc., as is conventional. Other navigational keys or controls may include directional keys (e.g., up, down, left, and right) to highlight different links, or icons, or to navigate text or other documents, etc. The navigational controls 30 also may be in the form of a roller ball or navigational ball, as will be appreciated. Other keys associated with the mobile telephone may include a volume key, an audio mute key, an on/off power key, a web browser launch key, a camera key and the like. The navigational keys may be embodied as "hard keys" or "soft keys" implemented on a touch-sensitive input device.

The display 28 (e.g., a touch screen) is configured to display information to a user, such as, operating state, time, telephone numbers, contact information, menus, etc. The user also can view and utilize various features and functions related to the various operating states of the mobile phone 20 on the display 28. The display 28 also may be used to visually display content received by the mobile telephone 20 and/or retrieved from a memory of the mobile telephone 20. For example, the user can watch movies, play video games, and browse the internet, etc., on the screen. Such audio/video materials may be stored on memory within the phone or accessed from remote servers, as will be appreciated.

The mobile telephone 20 includes conventional call circuitry that enables the mobile telephone 20 to establish a call or otherwise exchange signals with a call/calling device, typically another mobile telephone, landline telephone or other electronic device. The call/calling device, however, need not be another telephone, but may be some other device, such as an Internet web server, media server or the like. The call circuitry also may be responsible for transmitting text messages, emails, or text documents that are prepared by the user.

The top portion 24 is slidably coupled to the base 26 by the printed circuit board hinge assembly 22. In one embodiment, where the device operates in a portrait mode, the top portion 24 is slidable along a first axis (as indicated by the arrow A) with respect to the base 26 to expose an internal keypad 32 (e.g., a numeric keypad or a QWERTY keypad) having a set of alphanumeric keys, such as those included on a conventional telephone dial pad. Alternatively, the device may be configured to operate in a landscape mode where the top portion would be slidable along a second axis perpendicular to the first axis. The internal keypad may be configured to include "hard keys" or "soft keys" embodied on a touch-sensitive input device.

Figure 6:
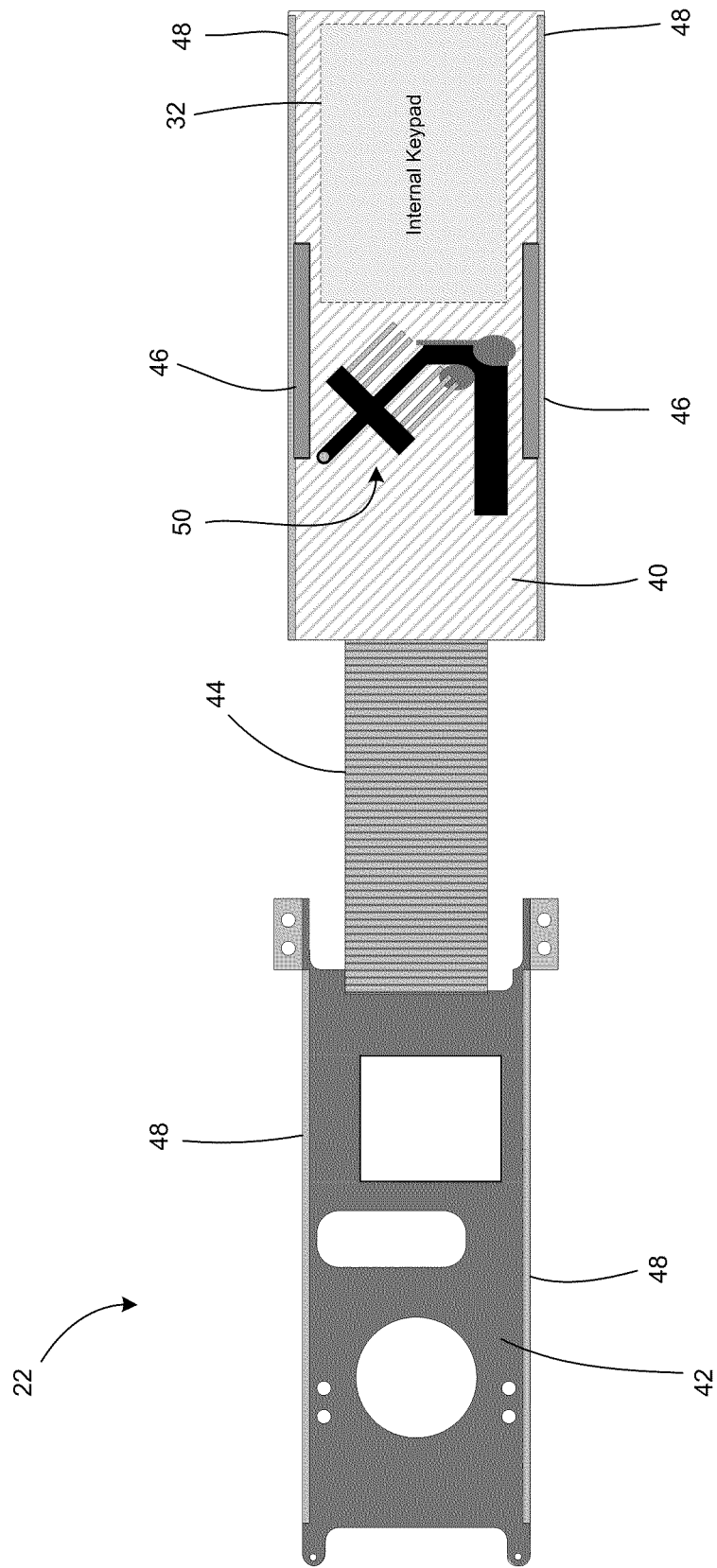
FIG. 6 is a top view of an exemplary slider hinge assembly in accordance with aspects of the disclosed technology.
Figure 7:
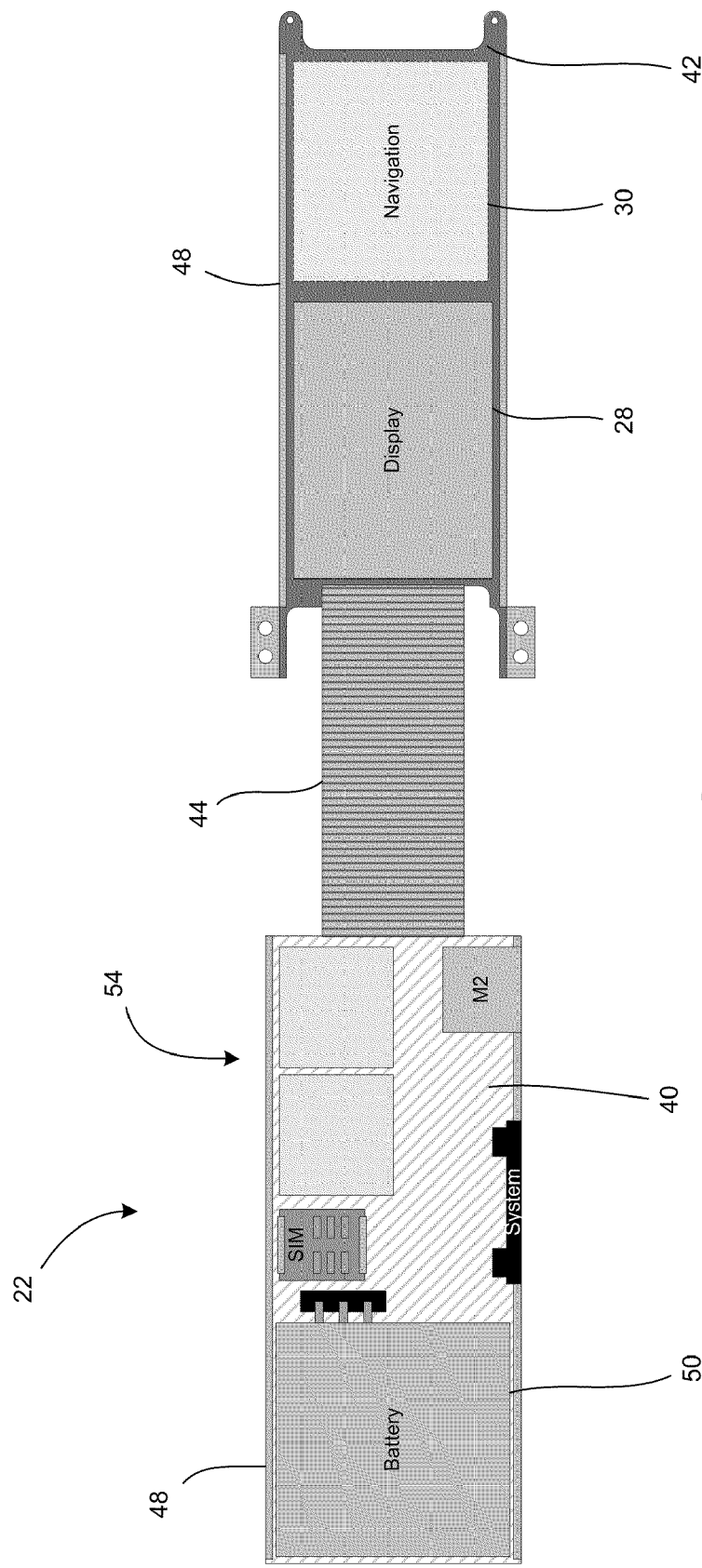
FIG. 7 is a bottom view of an exemplary slider hinge assembly in accordance with aspects of the disclosed technology.

Turning now to FIG. 6 and FIG. 7, an exemplary embodiment of a slider hinge assembly 22 is provided. The slider hinge assembly includes a base hinge member 40 (also referred to as a base plate or a base hinge plate) and an upper hinge member 42 (also referred to as an upper plate or an upper hinge plate). In one embodiment, the base hinge member 40 is comprised of a printed circuit board material. In another embodiment, the upper hinge member 42 is comprised of a printed circuit board material. In a preferred embodiment, the base hinge member 40 and the upper hinge member 42 both are comprised of a printed circuit board (PCB) material. Various printed circuit board materials may be employed. For example, the base hinge member 40 and the upper hinge member 42 may be comprised of rigid flex (PCB) (e.g., single-sided rigid flex PCB or double-sided rigid flex PCB).

In the embodiment illustrated in FIG. 6 and FIG. 7, the base hinge member 40 and the upper hinge member 42 are electrically coupled by a flex circuit 44 (coupled to the base hinge member and the upper hinge member by a suitable board-to-board connector). The flex circuit may include flex circuitry available with rigid flex PCB or another suitable flex connector.

The printed circuit board hinge assembly includes cooperative slide rails and slide guides 46 mounted directly to the printed circuit board material of the base hinge member 40 and/or the upper hinge member 42. The slide rails and/or slide guides may be mounted to the base hinge member 40 and/or the upper hinge member 42 using any suitable surface mount process. For example, the slide rails and/or slide guides may be soldered to the ground plane 48 of the printed circuit board base hinge member 40 and/or upper hinge member 42. Alternatively, the slide guides may be bolted onto the base hinge member through the PCB. Other fastening mechanisms may be employed without departing from the scope of the present invention. In addition, other hinge coupling mechanisms may be mounted or otherwise fastened directly to the printed circuit board of the base hinge member and/or the upper hinge member. For example, as shown in FIG. 6, the spring mechanism 50 may be mounted directly to the printed circuit board of the base hinge assembly, and then snapped onto the upper hinge member 42 upon assembly of the slider hinge.

It will be appreciated that the mobile phone component devices and circuit components may be electrically coupled (e.g., soldered directly) to the base hinge member 40 and/or the upper hinge member 42. For example, in FIG. 6, an internal keypad 32 is electrically coupled to the base hinge member 40. In FIG. 7 the display 28 and the navigational control 30 are electrically coupled to the upper hinge member 42. In addition, the battery 52 and phone circuit components 54 are electrically coupled to the base hinge member 40.

As such, the main printed circuit board assembly (PCBA) is integral with the hinge assembly. Therefore, the hinge assembly includes or otherwise supports the electronics, memory, and circuitry, etc., necessary for operating the mobile phone 20, including conventional call circuitry that enables the mobile telephone 10 to establish a call or otherwise exchange signals other devices, such as other mobile devices, internet web servers, media servers, or the like. The call circuitry also may be responsible for transmitting and receiving text messages, emails, or text documents. Additionally, the mobile phone 20 may include circuitry for browsing the internet, playing or viewing audio/visual materials, such as picture, music or video files and for gaming operations.

The base hinge member 40 and upper hinge member 42 may be assembled in a manner similar to that described above and illustrated in FIG. 1 and FIG. 2. For example, once the components and hinge mechanisms (e.g., slide guides, rails and spring mechanism) have been mounted to the base hinge member and/or the upper hinge member, the base and upper hinge members may be assembled and coupled by the slide guides and rails, and by the spring mechanism.

Once the printed circuit board hinge assembly is assembled, the other phone components (e.g., antennas, Bluetooth receiver, speakers, GPS, cameras and the like) may be mounted into plastic mechanical housings and snapped or otherwise fastened onto the base hinge member and the upper hinge member of the printed circuit board hinge assembly.

The provision of a mobile phone having a printed circuit board slider hinge assembly may provide numerous benefits. For example, the use of a printed circuit board assembly is believed to reduce the overall size of the hinge assembly and the manufacturing cost. By way of example, a conventional slider hinge assembly having a pair of thin stamp steel plates may have an assembled height of about 3-4 millimeters. This height is attributed to the hinge alone without any device components. This assembled height is accompanied by a device of less than optimal strength (especially as more components are assembled within the housings of the base portion and the upper portion). In contrast, the base hinge member and the upper hinge member of the printed circuit board hinge assembly could each have a thickness of about 0.8 millimeter. This reduced thickness is accompanied by a much stronger hinge assembly due to the rigidness and overall durability of printed circuit board (e.g., rigid flex printed circuit board). Allowing for typical components heights and gap between the base hinge member and the upper hinge member, the overall assembled height (including components) of the printed circuit board hinge assembly could be on the order of 4 millimeters, thereby providing a significant size reduction over a conventional slider hinge.

Due to the dual role of the printed circuit board material, a manufacturing step associated with hinge construction and mounting the hinge to the phone housings essentially is eliminated.

In summary, the provision of a printed circuit board slider hinge assembly makes the phone thinner, as the space required for the hinge is removed. The hinge rigidity is improved because the PCBA is thicker than the stamped steel, and if it was necessary to increase the strength, it as simple as adding a few more layers to the board. The use of single sided boards provides a good method to spread the heat generated by the RF modules out over the entire phone, thereby improving the phones ability to dissipation heat. The phone cost is less since the majority of the cost of the hinge is removed. The design cycle is reduced because the mechanical complexity is reduced.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A portable communication device comprising:
   a base; and
   a top portion coupled to the base by a slider hinge assembly that is configured to facilitate sliding motion between the base and the top portion, the slider hinge assembly including a base hinge member and an upper hinge member;
   wherein at least one of the base hinge member or the upper hinge member is comprised of a printed circuit board.

2. The portable communication device of claim 1, wherein the base hinge member and the upper hinge member are comprised of printed circuit board.

3. The portable communication device of claim 2, wherein the base hinge member and the upper hinge member are electrically coupled by a flex circuit.

4. The portable communication device of claim 2, wherein the base hinge member and the upper hinge member are electrically coupled by a board-to-board connector.

5. The portable communication device of claim 2, wherein the base hinge member and the upper hinge member are electrically coupled by a rigid flex connector.

6. The portable communication device of claim 1, wherein the base hinge member and the top hinge member are comprised of rigid flex printed circuit board.

7. The portable communication device of claim 6, wherein the base hinge member and the top hinge member are comprised of single-sided rigid flex printed circuit board.

8. The portable communication device of claim 6, wherein the base hinge member and the top hinge member are comprised of double-sided rigid flex printed circuit board.

9. The portable communication device of claim 1, wherein the top portion includes a display electrically coupled to the upper hinge member.

10. The portable communication device of claim 9, wherein the display is a touch-sensitive display.

11. The portable communication device of claim 1, wherein the top portion includes a navigational control electrically coupled to the upper hinge member.

12. The portable communication device of claim 11, wherein the navigational control is configured as a touch-sensitive input device.

13. The portable communication device of claim 1, wherein the base includes a keypad electrically coupled to the base hinge member.

14. The portable communication device of claim 1, wherein the base hinge member and the upper hinge member are coupled by a rail assembly.

15. The portable communication device of claim 14, wherein the rail assembly is mounted directly on the printed circuit board.

16. The portable communication device of claim 14, wherein the base hinge member and the upper hinge member each are coupled to a spring mounted directly on the printed circuit board.

17. The portable communication device of claim 1, wherein the portable communication device is a mobile telephone.

18. A hinge assembly for use in connection with a portable communication device, the hinge assembly comprising:
   a base plate and an upper plate, wherein the base plate and upper plate are coupled by a rail assembly that is configured to facilitate sliding motion of the upper plate relative to the base plate;
   wherein at least one of the base plate or the upper plate is comprised of a printed circuit board.

19. The hinge assembly of claim 18, wherein the base plate and the upper plate are comprised of printed circuit board.

20. The hinge assembly of claim 19, wherein the base plate and the upper plate are comprised of rigid flex printed circuit board.

21. The hinge assembly of claim 18, wherein the base plate and the upper plate are electrically coupled by a flex circuit or a rigid flex connector.

22. The hinge assembly of claim 19, wherein the rail assembly is mounted directly to the printed circuit board.

* * * * *